US008824887B2

(12) United States Patent
Vukovic et al.

(10) Patent No.: US 8,824,887 B2
(45) Date of Patent: Sep. 2, 2014

(54) METHOD AND SYSTEM FOR CONFIGURING A CONNECTION-ORIENTED PACKET NETWORK OVER A WAVELENGTH DIVISION MULTIPLEXED OPTICAL NETWORK

(75) Inventors: Mirjana Vukovic, Ottawa (CA); Dominic Goodwill, Kanata (CA); Eric Bernier, Ottawa (CA)

(73) Assignee: Rockstar Consortium US LP, Plano, TX (US)

( * ) Notice: Subject to any disclaimer, the term of this patent is extended or adjusted under 35 U.S.C. 154(b) by 703 days.

(21) Appl. No.: 13/051,030

(22) Filed: Mar. 18, 2011

(65) Prior Publication Data
US 2011/0222852 A1 Sep. 15, 2011

Related U.S. Application Data

(63) Continuation of application No. 12/609,039, filed on Oct. 30, 2009, now Pat. No. 7,925,161, which is a continuation of application No. 11/427,522, filed on Jun. 29, 2006, now Pat. No. 7,676,154.

(51) Int. Cl.
*H04J 14/00* (2006.01)
(52) U.S. Cl.
USPC ............................... 398/57; 398/58; 398/25
(58) Field of Classification Search
USPC ............. 398/42–73, 2, 3, 4, 5, 13, 14, 20, 33, 398/34, 141, 25
See application file for complete search history.

(56) References Cited

U.S. PATENT DOCUMENTS

| | | | |
|---|---|---|---|
| 6,788,896 B1 | 9/2004 | Wang et al. | |
| 6,928,245 B1 | 8/2005 | Li | |
| 6,944,163 B2 | 9/2005 | Bottorff et al. | |
| 7,171,121 B1 * | 1/2007 | Skarica et al. | 398/67 |
| 7,599,621 B2 * | 10/2009 | Guy et al. | 398/57 |
| 7,676,154 B2 | 3/2010 | Vukovic et al. | |
| 7,787,769 B1 * | 8/2010 | Slezak et al. | 398/57 |
| 2002/0126334 A1 | 9/2002 | Milton et al. | |
| 2003/0072052 A1 * | 4/2003 | Graves et al. | 359/124 |
| 2003/0170020 A1 | 9/2003 | Chaudhuri et al. | |
| 2004/0008622 A1 * | 1/2004 | Dolbec et al. | 370/223 |
| 2004/0213572 A1 | 10/2004 | Doh et al. | |
| 2005/0094998 A1 | 5/2005 | Bernier et al. | |
| 2010/0104279 A1 | 4/2010 | Vukovic | |

* cited by examiner

*Primary Examiner* — M. R. Sedighian
(74) *Attorney, Agent, or Firm* — Ridout & Maybee LLP

(57) ABSTRACT

A network planning tool and method for configuring a connection-oriented packet network over a WDM optical network without an optical control layer, such as a SONET/SDH layer. The optical network includes a plurality of optical fibers interconnected through nodes and the connection-oriented packet network, such an Ethernet network, MPLS network, or pseudowire network, includes two or more terminal devices. The method and tool function by building an association between the components of the physical layer, such as the optical fiber, and their geographic location or path. The connection-oriented packet network is configured by building multi-link trunks (MLTs) between terminal devices, where the MLTs are built by aggregating lightpaths that traverse distinctive geographic paths. The MLTs are planned and configured through aggregating lightpaths that traverse incongruent sets of photonic elements. A predetermined target for resiliency to physical failure events may determine the degree of congruence allowed between the sets of photonic elements associated with lightpaths in the same MLT.

30 Claims, 6 Drawing Sheets

METHOD AND SYSTEM FOR CONFIGURING A CONNECTION-ORIENTED PACKET NETWORK OVER A WAVELENGTH DIVISION MULTIPLEXED OPTICAL NETWORK

CROSS-REFERENCE TO RELATED APPLICATIONS

The present application is a continuation of U.S. patent application Ser. No. 12/609,039, filed Oct. 30, 2009 and owned in common herewith. U.S. patent application Ser. No. 12/609,039 is a continuation of U.S. patent application Ser. No. 11/427,522, filed Jun. 29, 2006.

FIELD OF THE INVENTION

The present invention relates to network planning and configuration and, in particular, to the configuration of a connection-oriented packet network over a wavelength division multiplexed (WDM) optical network.

BACKGROUND OF THE INVENTION

The operation and interoperation of local area networks (LAN) and metropolitan area networks (MAN) are governed by a number of standards developed through IEEE 802, IETF and ITU Working Groups.

For example, the 802.3 Working Group develops standards related to Local Area Networks (LAN), such as Ethernet networks.

Fiber optics are gaining wider acceptance as the media of choice for interconnecting LANs with high capacity or serving as the backbone for MANs. The need for higher bandwidth and improvements in optical switching have been large factors in the increasing demand for optical networks.

A typical Ethernet over optical fiber network relies upon a SONET/SDH layer in the Metropolitan Area Network and Campus environment to provide for resiliency to hardware failures at the physical layer. The SONET/SDH layer necessarily adds certain operational complexity to the communications.

Multiple Ethernet signals can be multiplexed on a single optical fiber using wavelength division multiplexing technology (WDM). When using WDM the signals are all assigned a unique wavelength and are allowed to share a single optical fiber. When using WDM technology Ethernet signals are normally encapsulated in a SONET or OTN frame. The SONET/SDH layer necessarily adds certain operational complexity to the communications.

Cost saving in terms of equipment and bandwidth may be realized by eliminating the SONET/SDH layer; however, the Ethernet layer would become vulnerable to failures at the physical layer.

The IEEE 802.3 Working Group has defined a link aggregation standard, known as IEEE 802.3ad. However, this standard is predicated on a physical layer that supports a resilient transport network such as a SONET/SDH layer. The 802.3ad standard thus makes no provision for the failure and resiliency attributes of a directly-connected WDM network (i.e. a WDM optical network without an optical control layer).

Accordingly, it would be advantageous to have a method for configuring a connection-oriented packet network, like an Ethernet network, over a WDM optical network without an optical control layer.

Moreover, the IETF MPLS Working Group develops standards related to networks that operate on the basis of label switch paths (LSP) that tunnel lower layer services across an internet protocol (IP) network. The IETF PWE3 Working Group develops standards for link concatenation structures, known as pseudo-wires, that may be constructed on a variety of network types including MPLS, IP, Ethernet and SONET networks. By way of the methods prescribed in the IETF standards, complex layered networks may be configured. For example, a point-to-point Ethernet service may be configured using pseudo-wires that exploit MPLS label switch routes that are themselves configured over an underlying IP/Ethernet/transport network.

A typical MPLS network achieves resiliency by way of a underlying routing IP layer, or an underlying Ethernet link aggregation layer, that themselves achieve resiliency by way of an underlying SONET/SDH layer. The SONET/SDH layer necessarily adds certain operational complexity to the communications and thereby reduces effective bandwidth. As indicated above, cost saving in terms of equipment and bandwidth may be realized by eliminating the SONET/SDH layer at the expense of resiliency.

The IETF MPLS and pseudo-wire Working Groups have provided standard methods for concatenating links to define routes through a network. Further, drafts submitted at IETF Working Groups have included proposals for an Optimized Multipath Algorithm that combines MPLS label switch paths according to an algorithm, so as to create a structure similar to that of an IEEE 802.3ad link aggregation structure but where the links are LSPs instead of Ethernet links.

Accordingly, it would be advantageous to have a method for configuring a connection-oriented packet network, like an MPLS network or a pseudowire network, over a WDM optical network without an optical control layer.

More broadly, it would be advantageous to provide for a network planning tool and method that improves Ethernet, MPLS, pseudo-wire and/or Optimized Multipath Algorithm resiliency in the absence of an underlying resilient layer.

SUMMARY OF THE INVENTION

The present invention provides a network planning tool and method for configuring a connection-oriented packet network over a WDM optical network in the absence of an optical control layer. In one aspect of the invention, the tool and method provide for configuring these networks to meet a predetermined resiliency target.

The optical network comprises a photonic layer that includes a plurality of photonic elements, like optical fibers, interconnected through nodes, and the Ethernet network includes two or more Ethernet switches.

The components of the photonic layer may include fiber conduits, fiber bundles, optical fibers, fiber patch panels, optical multiplexers, optical filters, optical amplifiers, photonic switches, reconfigurable optical add/drop multiplexers, WDM regenerators, WDM wavelength translators, WDM electro-optic interface devices, and assemblies of these elements. The method and tool may function so as to build an association between the elements of the photonic layer and their geographic locus or path. Those components that share the same geographic loci may be noted.

The photonic layer is used by the WDM layer. The components of the WDM layer are defined in terms of lightpaths. The method and tool may function so as to build an association between a lightpath and the loci of the photonic layer components that are used by the lightpath.

The WDM layer is used by the connection-oriented packet layer, such as an Ethernet layer. The connection-oriented packet network is configured by building multi-link trunks (MLTs) between terminal devices, like Ethernet switches, where the MLTs are built by aggregating two or more links, wherein each link comprises one or more concatenated lightpaths. The method and tool may function so as to aggregate links to an MLT having regard for the respective geographic loci associated with the lightpaths that make up the links. The method and tool may be used to ensure the MLTs are planned and built such that a first link and a second link in the MLT do not share a common geographic path. In one embodiment, the MLT may include links that use respective sets of physical layer components where the sets are completely disjoint or where the sets intersect to a minimal extent that meets a predetermined resiliency target. In other words, the MLT can be configured to provide the connection-oriented packet network with topological diversity and, therefore, meet a predetermined target for resiliency to physical failure events.

It should be understood that an MLT in this invention may, in some embodiments, be a link aggregation structure as defined in IEEE 802.3ad, or an Optimized Multipath Algorithm label switch path structure as described in IETF drafts, or any other structure of parallel logical links.

In one aspect, the present invention provides a method of configuring a connection-oriented packet network over a wavelength division multiplexed (WDM) optical network without an optical control layer. The WDM network includes a first terminal device and a second terminal device, and each terminal device includes WDM electro-optic interfaces. The WDM network has a photonic layer connecting the WDM electro-optic interfaces, and the photonic layer includes a plurality of photonic layer elements including optical fibers. The photonic layer provides a plurality of lightpaths between the terminal devices, and each lightpath traverses a set of the photonic layer elements. The method includes the steps of associating a geographic loci with each of the photonic layer elements, defining a multilink trunk between the first terminal device and the second terminal device, and selecting a first lightpath to aggregate to the multilink trunk. The first lightpath traverses a first set of the photonic layer elements, and the first set of photonic layer elements has a first set of associated geographic loci. The method also includes a step of selecting a second lightpath to aggregate to the multilink trunk. The second lightpath traverses a second set of the photonic layer elements, and the second set of photonic layer elements has a second set of associated geographic loci. The step of selecting the second lightpath includes selecting the second lightpath on the basis that the second set of geographic loci is incongruent with the first set of geographic loci.

In another aspect, the present invention provides a computer-implemented network planning tool for configuring a connection-oriented packet network over a wavelength division multiplexed (WDM) optical network without an optical control layer. The planning tool includes a computer readable medium storing computer executable instructions. The WDM network includes a first terminal device and a second terminal device, and each terminal device includes WDM electro-optic interfaces. The WDM network has a photonic layer connecting the WDM electro-optic interfaces, and the photonic layer includes a plurality of photonic layer elements including optical fibers. The photonic layer provides a plurality of lightpaths between the terminal devices, and each lightpath traverses a set of the photonic layer elements. The computer executable instructions include computer executable instructions for associating a geographic loci with each of the photonic layer elements, computer executable instructions for defining a multilink trunk between the first terminal device and the second terminal device, and computer executable instructions for selecting a first lightpath to aggregate to the multilink trunk. The first lightpath traverses a first set of the photonic layer elements, and the first set of photonic layer elements has a first set of associated geographic loci. The network planning tool also includes computer executable instructions for identifying a second lightpath to aggregate to the multilink trunk. The second lightpath traverses a second set of the photonic layer elements, and the second set of photonic layer elements has a second set of associated geographic loci. The computer executable instructions for identifying the second lightpath perform identification of the second lightpath on the basis that the second set of geographic loci is incongruent with the first set of geographic loci.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show one or more embodiments of the present invention, and in which.

Similar reference numerals are used in different figures to denote similar components.

DESCRIPTION OF SPECIFIC EMBODIMENTS

Figure 1:
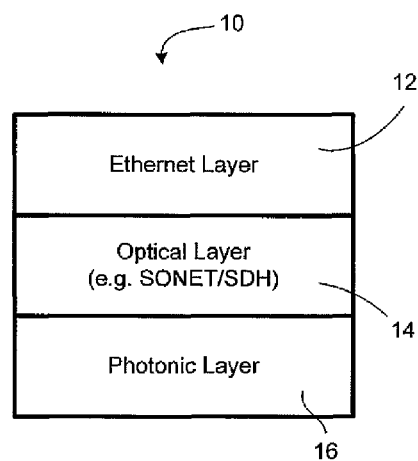
FIG. 1 diagrammatically shows a known networking architecture model for Ethernet over optical networks.

Reference is first made to FIG. 1, which diagrammatically shows a known networking architecture model 10 for Ethernet over optical networks. The model 10 is a conventional configuration in which an Ethernet layer 12 operates over an optical layer 14, which in this example is a SONET/SDH layer. As used in this description, an optical layer refers to a layer where the signals from the Ethernet switch are captured by a specialized electronic system which manages banks of WDM transponders. The electronic system directs the signal to a predetermined wavelength, through a transponder on the photonic layer and will switch the wavelength and direction on the ring in the advent of a failure. The optical layer 14 in turn operates over the physical photonic layer 16. The physical photonic layer 16 may employ Wavelength Division Multiplexing (WDM) data transport, which may by configured as Dense Wavelength Division Multiplexing (DWDM), Course Wavelength Division Multiplexing (CWDM), or Sparse Wavelength Division Multiplexing (SWDM).

Figure 2:
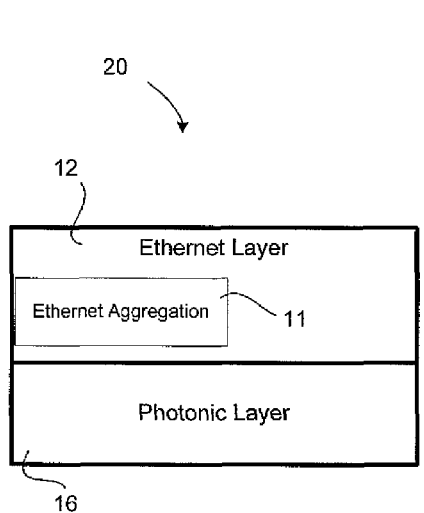
FIG. 2 diagrammatically shows a second networking architecture model for Ethernet over optical networks.

Reference is now made to FIG. 2, which shows a second networking architecture model 20, proposed in accordance with the present application. The second model 20 includes the Ethernet layer 12, but eliminates the optical (SONET/SDH) layer 14 (FIG. 1). In other words, in the second model 20, the Ethernet layer 12 operates directly over the photonic layer 16, thereby eliminating the operational complexity associated with the SONET/SDH layer 14. It will be noted that Ethernet aggregation 11 is performed at the Ethernet layer 12. The Ethernet aggregation 11 aspect includes the defining of multilink trunks to form the Ethernet network, as will be explained in greater detail below.

The difficulty associated with eliminating the SONET/SDH layer 14 is that this layer provides certain resiliency features. For example, the SONET/SDH layer 14 typically uses a ring topology with a SONET-defined protocol for identifying failures and coordinating recovery in the event of a failure at one point on the ring. The Ethernet layer 12 typically has no knowledge of the underlying physical topology and relies upon the SONET/SDH layer 14 to manage recovery from physical network failures. If the SONET/SDH layer 14 is removed, then the network improves its overhead but loses its resiliency.

Accordingly, in one aspect, the present application provides a method of configuring an Ethernet network over a WDM photonic network so as to improve resiliency.

Figure 3:
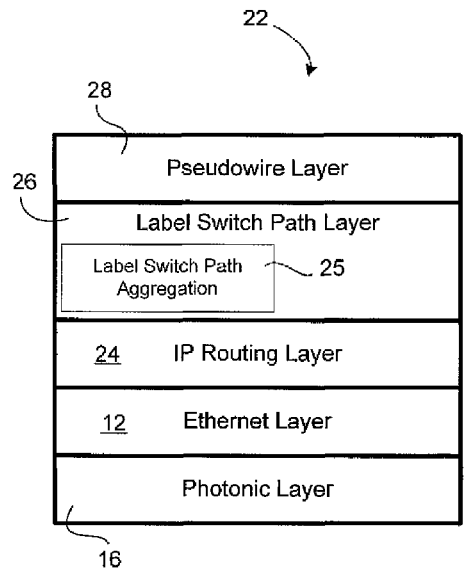
FIG. 3 diagrammatically shows a networking architecture model for MPLS over IP over Ethernet over optical networks.

To provide a further example, reference is now made to FIG. 3, which shows a networking architecture model 22 for MPLS over IP, over Ethernet, over a WDM photonic network. From the model 22, it will be noted that a label switch path layer 26 operates over an IP layer 24, which in turn operates over the Ethernet layer 12. The Ethernet layer 12 runs directly atop the photonic layer 16. A pseudowire layer 28 may be provided above the label switch path layer 26. The label switch path layer 26 may include label switch path aggregation 25 for forming multilink trunks, as will be described in greater detail below. It will be noted that the various connection-oriented packet layers operate atop the photonic layer 16 without an intermediate optical layer 14 (FIG. 1) such as SONET/SDH.

Those skilled in the art will recognize that various other networking architecture models may be realized, including various combinations of Ethernet, IP, MPLS, and/or pseudowire layers.

Figure 4:
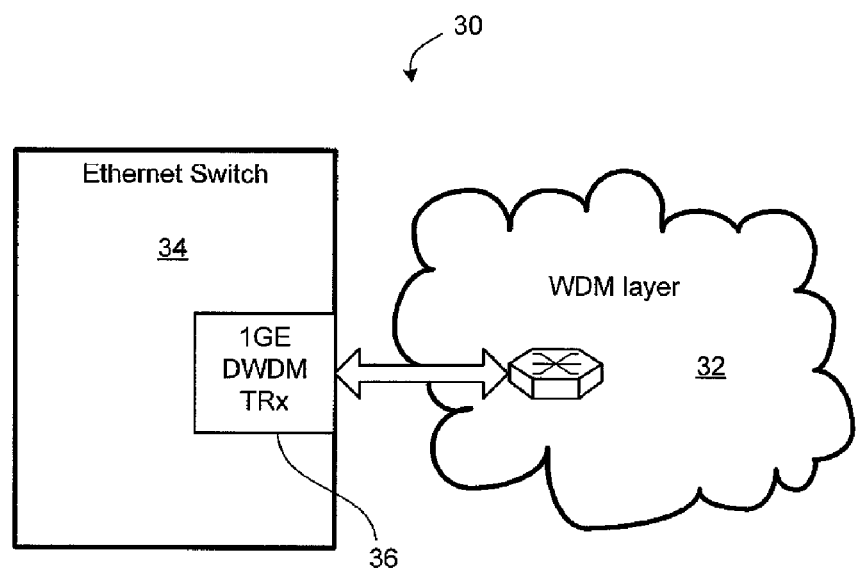
FIG. 4 shows, in block diagram form, a portion of a network in accordance with the present application.

Reference is now made to FIG. 4, which shows, in block diagram form, a portion of a network 30 in accordance with the present application. The network 30 includes a WDM layer 32, which includes optical fiber, optical routers, switches, and other photonic layer equipment. The network 30 also includes a plurality of Ethernet switches 34 or hubs (one shown), where the switch 34 or hub includes integrated DWDM pluggable optical transceivers 36 (one shown).

By putting the DWDM interface directly into the Ethernet switch 34, the result is that lightpaths terminate at layer 2 nodes. In other words, there is a mapping between Ethernet ports and lightpaths; interlayer binding makes the photonics a function of the data link layer, instead of the data link layer riding on top of a photonic layer.

Figure 5:
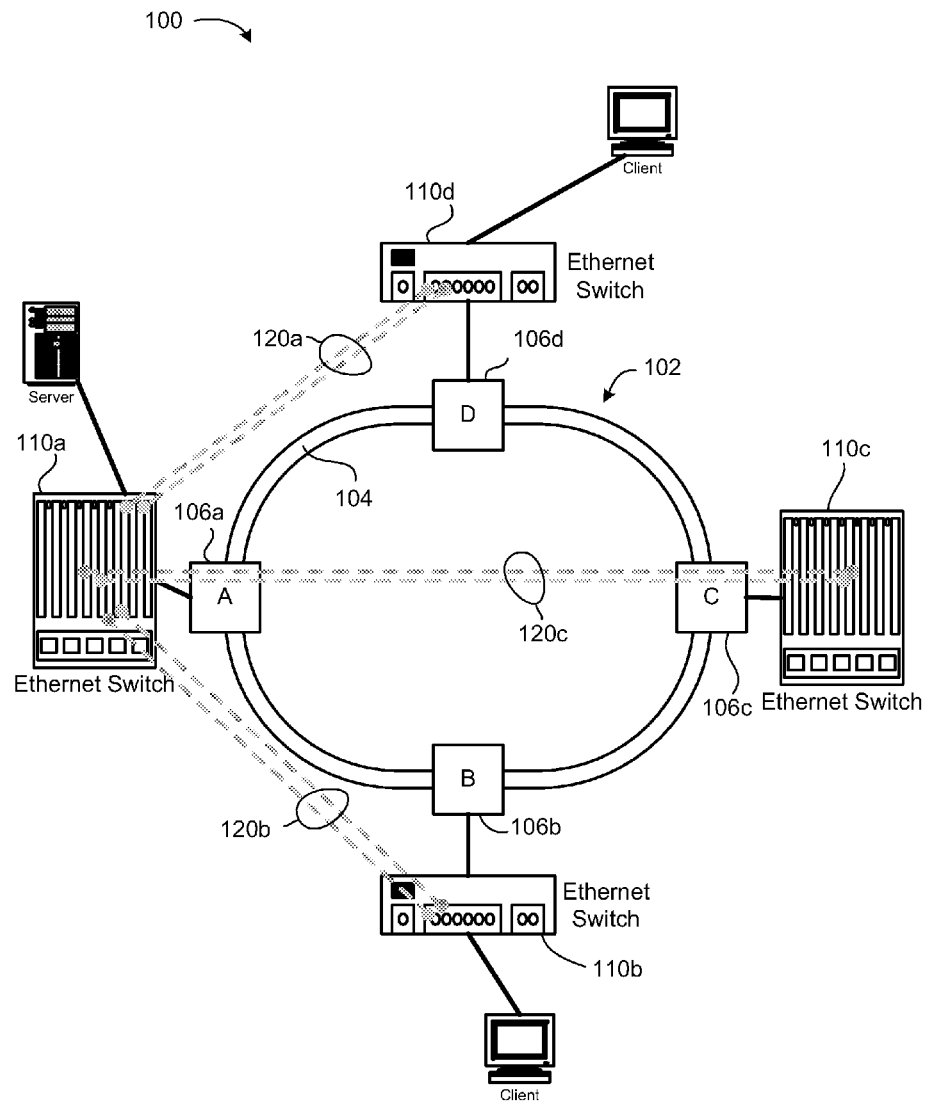
FIG. 5 shows one embodiment of an example photonic network.

Reference is now made to FIG. 5, which shows one embodiment of an example photonic network 100. The photonic network 100 is configured as a fiber ring 102 for the simplicity of illustration, although those skilled in the art will appreciate that other topologies are possible.

The fiber ring 102 includes one or more optical fibers 104 each carrying a plurality of wavelengths. Typically, the fiber ring 102 may include at least two optical fibers 104, one for transmissions clockwise, the other for transmission counter-clockwise around the ring, although the present application is not limited to this embodiment.

The fiber ring 102 includes a plurality of photonic elements, such as nodes 106 (shown individually as 106a, 106b, 106c, 106d). The nodes 106 may be optical WDM MUX/DMUX equipment. Simple nodes could be employed where a simple filter is used to remove and add wavelengths on the photonic ring. In some embodiments, the nodes 106 may include a photonic cross-connect switch for directing wavelength to desired output ports, wavelength translators could also be used for changing wavelengths. Those skilled in the art will appreciate the breadth of possible implementations of the nodes 106.

The optical network 100 is accessed by Ethernet switches 110 (shown individually as 110a, 110b, 110c, and 110d). Each Ethernet switch 110 connects to the fiber ring 102 through one of the nodes 106 on the fiber ring 102. The Ethernet switches 110 include DWDM optical transceivers. In particular, the Ethernet switches 110 include a DWDM optical transceiver for sending and receiving a specific wavelength for each "port" on the Ethernet switch 110. The designated node 106 for a given Ethernet switch 110 manages the insertion or adding onto the fiber ring 102 of wavelengths transmitted by the given Ethernet switch 106 and manages the removal or dropping of wavelengths for reception by the given Ethernet switch 106. The methods and equipment for adding and dropping of wavelengths in an optical node will be understood by those of ordinary skill in the art. An example embodiment of such an optical node is described in US patent publication no. 2002/0126334A1, published Sep. 12, 2002, and owned in common herewith.

An Ethernet network is established over the photonic network 100. The Ethernet network is configured to include logical links 120 (shown individually as 120a, 120b, 120c) between the switches 110. In the present embodiment, the Ethernet switch 110a is connected to an application host or server, and the Ethernet switch 110a therefore acts as a hub of the Ethernet network. Ethernet switches 110b, 110c, and 110d are connected to client devices or other networks containing client devices. The Ethernet-level logical link connections 120a, 120b, 120c between the Ethernet switches 110 are shown in dashed lines. It will be appreciated that the description of the present embodiment does not limit the scope of possible embodiments to hub and spoke architecture.

IEEE Standard 802.3-2002 defines certain characteristics and behaviors applicable to Ethernet-type networks. Clause 43 of the standard (introduced by way of IEEE 802.3ad) describes the possibility of link aggregation and the use of an optional link aggregation sublayer. Aggregation is used to allow a MAC client to communicate using multiple paths/links where the fact of the multiple paths/links is invisible to the MAC Client. An Aggregator presents a single interface to the MAC client and manages the parsing and multiplexing associated with transmitting and receiving data through multiple ports. Multiple links aggregated together may be referred to as a Multi-link Trunk (MLT).

In accordance with the present application, MLTs are used to establish the Ethernet network over the optical network 100 so as to address the loss of resiliency due to the absence of a SONET/SDH or optical layer. In particular, the MLTs are built over WDM based upon the aggregation of two or more lightpaths connecting two nodes 106. Where FIG. 5 depicts an MLT using a pair of dashed lines, it will be appreciated that each dashed line is intended to represent two lightpaths. One lightpath allows for transmission and reception in one direction, and the other lightpath allows for transmission and reception in the other direction, thereby collectively providing full-duplex operation between a pair of Ethernet switches 110. It will be appreciated that each MLT includes at least four lightpaths and, therefore, two full-duplex transmission links.

Those skilled in the art will appreciate that the term "lightpath" is used to describe a point-to-point all optical wavelength-level channel between a transmitter at one of the Ethernet switches 110 and a receiver at another of the Ethernet switches 110 in a logical link. Although in many cases a lightpath may be established over a single wavelength, those skilled in the art will appreciated that in some embodiments a link may traverse a node or switch that causes the link to be switched to a different wavelength. For this reason, the term "lightpath" is used to describe the constituent elements of an MLT, although it will be understood that at any one physical point along its path a "lightpath" is a single wavelength. In some embodiments, a link between two Ethernet switches 110 may include two or more concatenated lightpaths.

In configuring the Ethernet network by establishing the MLTs, the two or more lightpaths are selected for aggregation to the MLT such that they provide resiliency in the case of physical failure. In particular, the two or more lightpaths are selected such that they have a distinctive geographic path. In other words, the second lightpath added to an MLT should travel a different physical path using different photonic elements than the first lightpath.

To configure the Ethernet network or, in particular, aggregate lightpaths to form an MLT and achieve geographic distinctiveness, a concept of geographic loci or physical location—i.e. of the physical layer—is required at the Ethernet layer. In other words, the layer 2 planning or configuring operation makes use of knowledge regarding the physical layer. The use of concepts of lightpath, photonic elements, and geography (i.e. level 0) at the level of Ethernet layout (i.e. level 2) logical link planning may be referred to as 'interlayer binding'.

Figure 6:
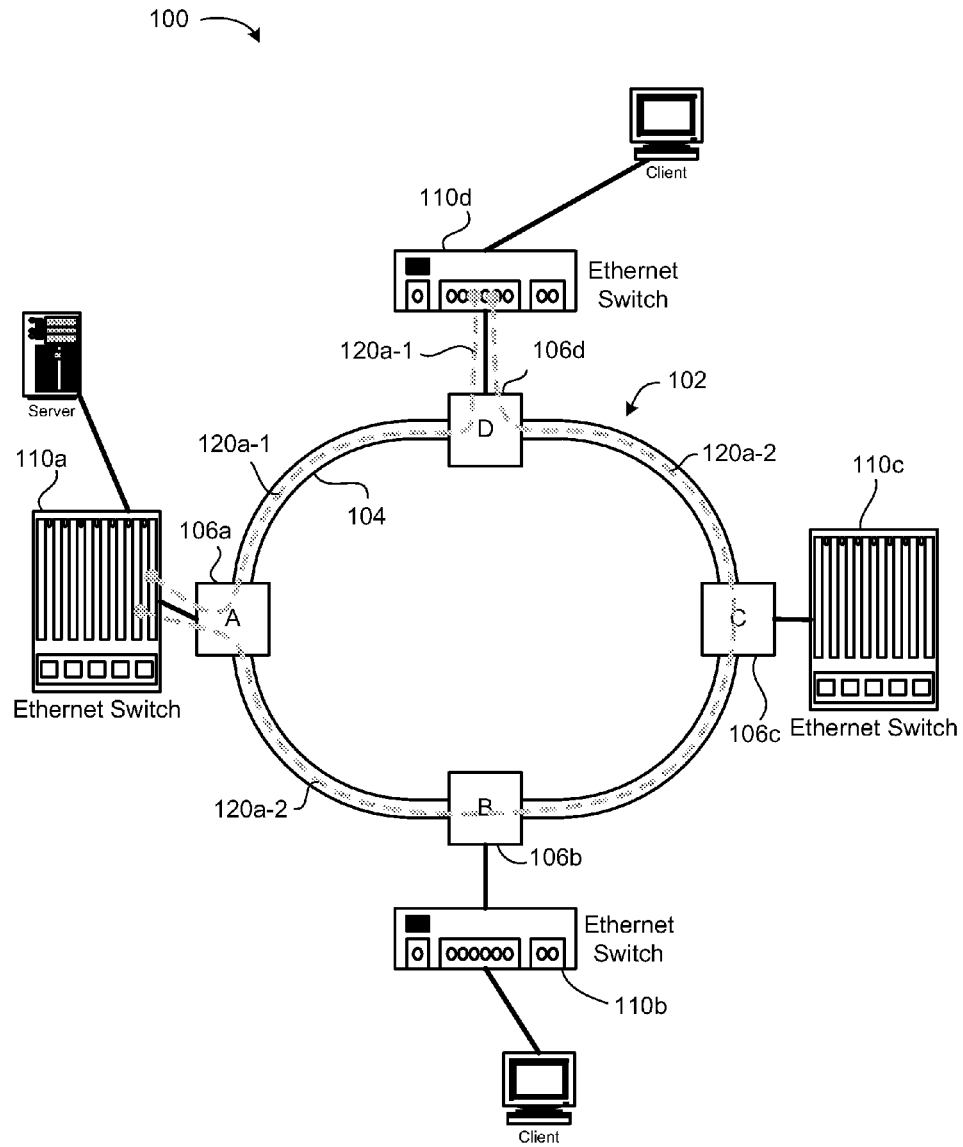
FIG. 6 shows the geographic paths of a logical link within the example photonic network of FIG. 5.

By way of example, reference is now made to FIG. 6, which shows the geographic paths of one of the logical links 120a in the optical network 100 of FIG. 5. The four sections of optical fiber 104 forming the fiber ring 102 travel distinctive geographic paths. The logical link 120a set up between Ethernet switch 110a and Ethernet switch 110d includes at least two pair of lightpaths, a first lightpath pair 120a-1 and a second lightpath pair 120a-2, having distinctive geographic paths. In particular, the first lightpath pair 120a-1 traverses the segment of the fiber ring 102 between nodes 106a and 106d. The second lightpath pair 120a-2 added to the MLT for logical link 120a is chosen to have a different geographic path. Accordingly, the second lightpath pair 120a-2 is selected such that it traverses the other sections of the fiber ring 102 passing through nodes 106b and 106c. In this manner, if a physical failure occurs at any one point on the ring 102, such as a cut optical fiber 104, the MLT provides resiliency by offering a different geographic path.

The standard of a distinctive geographic path may, in one embodiment, be realized as distinctive optical fiber. It will be appreciated that, in some instances this may result in lightpaths in the same physical space, since fibers may be bundled in a conduit and travel the same route. In another embodiment, the standard may be realized as distinctive conduits, meaning that even when the lightpaths travel in different fibers, the fibers cannot be co-located in a common physical conduit. In yet another embodiment, the standard may be realized as distinctive optical equipment, meaning that intermediate nodes, amplifiers, etc., are not shared by the lightpaths. In yet other embodiments, an association may be made between lightpaths and geographic markers, such as GPS coordinates, street names, etc., and geographic distinctiveness may be realized through ensuring distinctive geographic markers. Other embodiments may realize application of the standard of 'distinctive geographic path' in other manners, including combinations of the above-described factors.

In one embodiment, each photonic element is associated with a geographic loci, including optical fibers, nodes, switches, etc., and each lightpath is recognized as existing over a set of photonic elements. For example, with reference to FIG. 6, the first pair of lightpaths 120a-1 is established over a set of photonic elements that includes node 106a, node 106d, and an optical fibre 104 between node 106a and node 106d. The second lightpath pair 120a-2 is established over a set of photonic elements that includes all four nodes 106, and an optical fiber 104 between node 106a and node 106d, an optical fiber between node 106b and node 106c, and an optical fiber between node 106c and node 106d. Accordingly, the set of photonic elements supporting the second lightpath pair 120a-2 have geographic loci that are incongruent (although not entirely distinctive because of the common nodes 106a and 106d) with the geographic loci of the set of photonic elements supporting the first lightpath pair 120a-1. The lightpaths 120a therefore have a certain level of geographic distinctiveness. It will be appreciated that in a more complex network structure, various candidate lightpaths may present varying degrees of geographic distinctiveness from one another, thereby allowing for selection of two lightpaths having at least a minimal degree of geographic distinctiveness. In one embodiment, the candidate lightpaths may be selected on the basis that they have the greatest degree of geographic distinctiveness (i.e. the greatest degree of incongruence between their respective sets of photonic elements).

Figure 7:
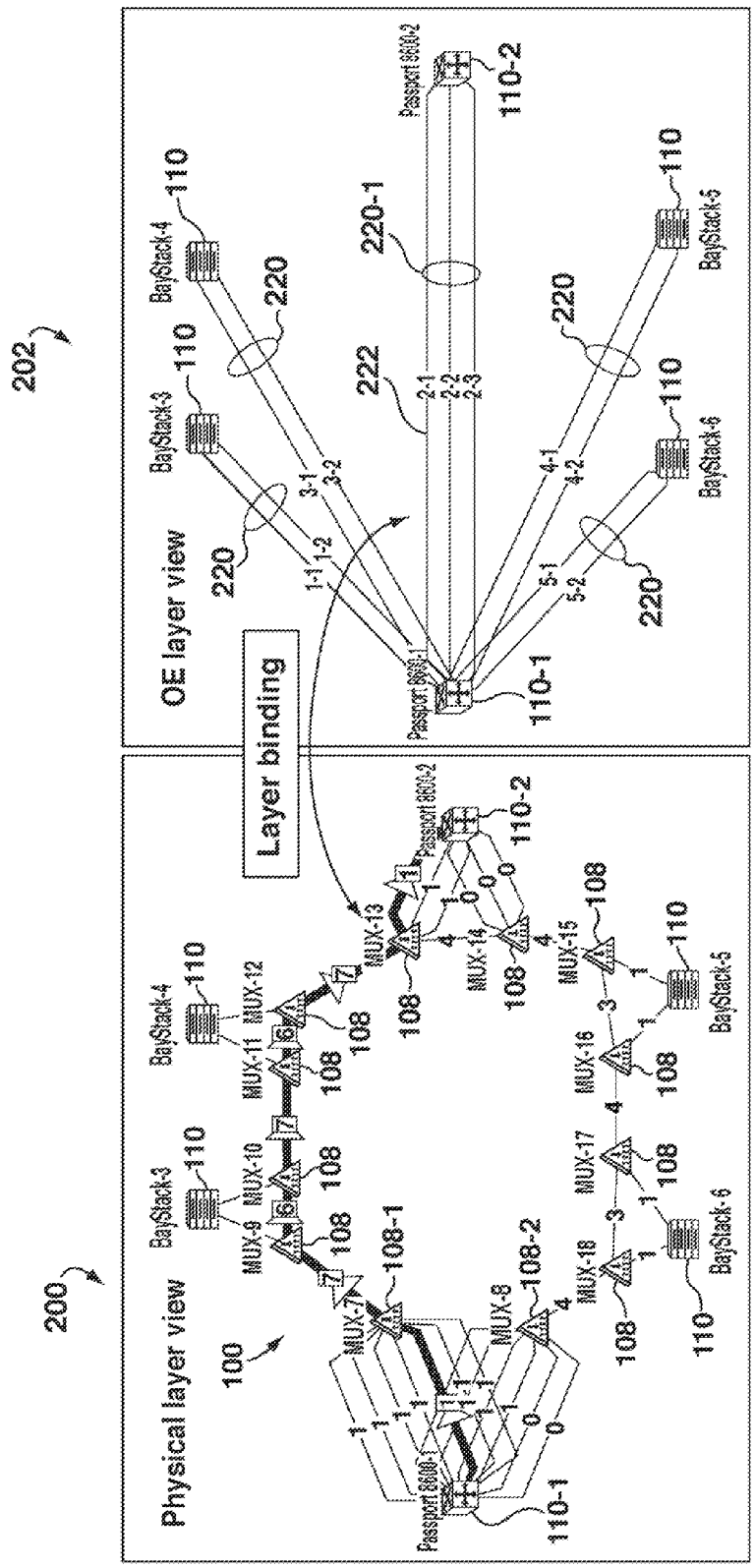
FIG. 7 shows, in diagrammatic form, an example user interface of inter-layer network planning tool.

Reference is now made to FIG. 7 which illustrates, in diagrammatic form, an example user interface of inter-layer network planning tool. FIG. 7 includes two network views: a physical layer view 200 and an optical Ethernet layer view 202.

From the physical layer view 200, it will be noted that the optical network 100 includes six Ethernet switches 110 interconnected by the fiber ring 102 through a plurality of nodes (shown broken down into a plurality of MUX/DEMUX elements 108, e.g. two such elements 108 per node). The individual hops between elements are shown with a number indicating the quantity of distinct wavelengths that make up the hop. These wavelengths may be distinctive wavelengths in the same fiber or some of them may be the same wavelengths in two or more optical fibers. The connections between the Hub Ethernet switch 110-1 and its associated MUXs 108-1, 108-2 are shown with distinctive lines for each wavelength to illustrate the number of wavelengths that make up the connection.

It will be noted that at many of the nodes along the fiber ring 102 a wavelength is removed and a wavelength is added by a MUX/DEMUX pair of elements 108 for the connection to the corresponding Ethernet switch 110.

The optical Ethernet layer view 202 shows the hub Ethernet switch 110-1 and MLTs 220 connecting the hub Ethernet switch 110-1 to each of the other Ethernet switches 110. The MLTs 220 include at least two lightpaths pair. The MLT 220-1 between the hub Ethernet switch 110-1 and Ethernet switch 110-2 includes three lightpaths pair.

Each MLT 220 includes at least a first lightpath pair and a second lightpath pair traversing geographically diverse paths. In assembling the MLT by aggregating individual lightpaths to the MLT, the graphical user interface may present candidate lightpaths in the physical layer view for selection by a user. For example, it may provide a picklist of the candidate lightpaths, which may be uniquely labeled or otherwise identified. In one example embodiment, candidate lightpaths may be highlighted in the physical layer view. As shown in FIG. 4, if a lightpath is selected in the optical Ethernet view, the physical layer view may highlight the geographic path traversed by the selected lightpath. This feature may assist the network designer/planner in visually identifying physically divergent lightpaths to ensure that the MLT contains at least two lightpaths pair traveling distinctive geographic paths. The MLTs may then be built from aggregating lightpaths using the principle that at least one lightpath pair in the MLT should have a distinctive geographic path from at least one other lightpath pair in the MLT. The decision as to how much geographical diversity is required may be taken into account by the planner depending on the service agreement and the required resiliency.

Figure 8:
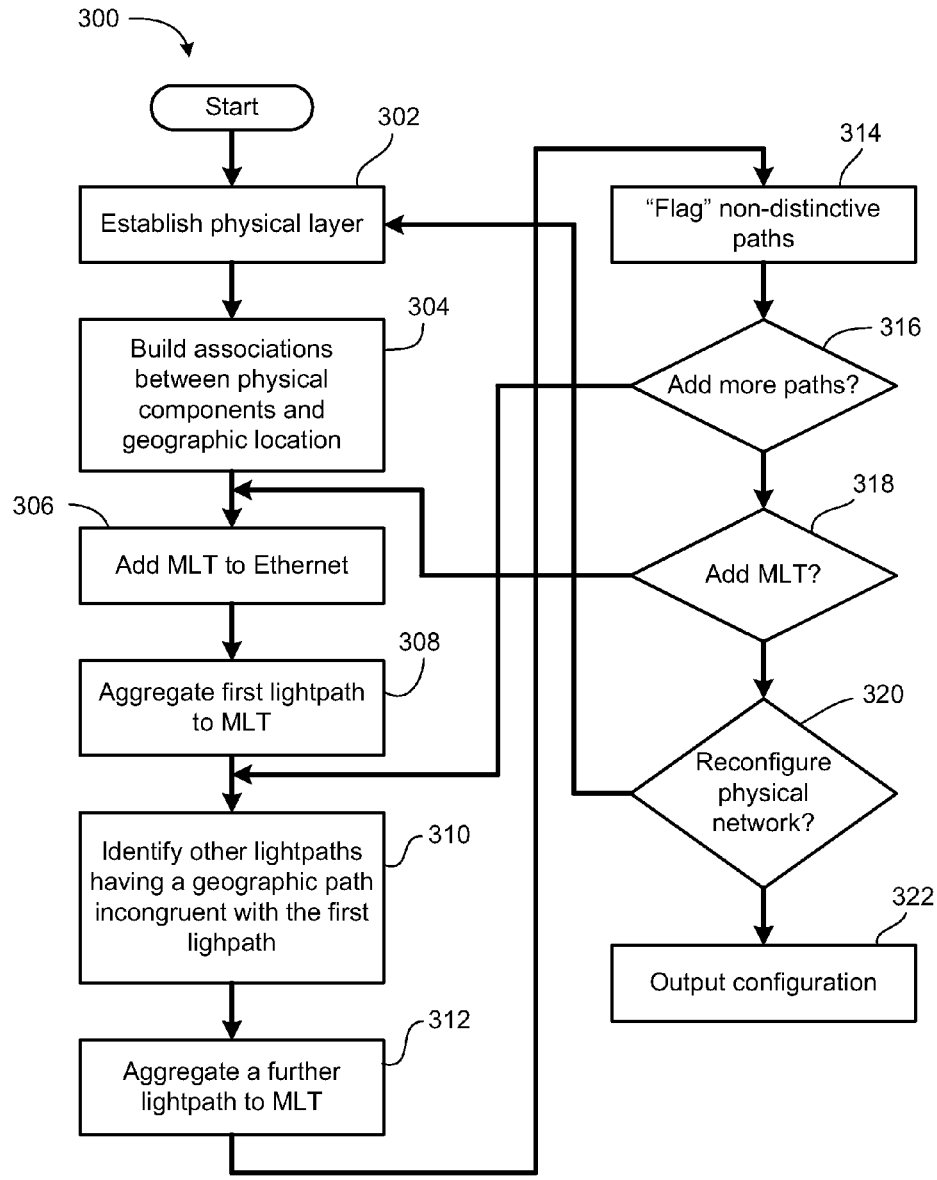
FIG. 8 shows, in flowchart form, an embodiment of a method for configuring an Ethernet network over a WDM optical network.

Reference is now made to FIG. 8, which shows, in flowchart form, an embodiment of a method 300 for configuring an Ethernet network over a WDM optical network. The method 300 may, in one embodiment, be embodied in a network planning tool implemented in software stored in on a computer readable medium and providing instructions for execution by the processor of a general purpose computer in known manner. The software may generate a graphical user interface in known manner to display information to a user and solicit and receive user input in accordance with the method 300. The suitable programming of such software will be within the understanding of a person of ordinary skill in the art having regard to the description herein.

The method 300 begins in step 302 with the establishment of the physical layer. This step 302 includes the design of the physical layer optical network, such as the selection of Ethernet switches, nodes, fiber links, and other physical plant. Portions of this step 302 may be performed off-line. The step 302 in a computer-implemented embodiment of the method 300 may include the selection of constituent physical elements of the optical network and the placement of those elements in a physical network view on the graphical user interface. For example, switches, nodes, and such discrete elements may be represented by graphical icons. The user may be prompted to name or label each new item. Fiber links may be established between distinct elements. Distances and other physical details regarding the optical network may be input by the user. The graphical user interface may provide the user with a graphical image of the selected and assembled physical layer network, such as that shown in FIG. 3 or FIG. 4.

In step 304, associations are made between the physical elements of the physical layer and geography. In particular, each optical fiber, or wavelength, may be assigned a geographical loci or indicator relating thereto.

In one embodiment, the associations may be made by selecting co-located elements, such as two fibers sharing a common path, and choosing to designate the selected elements as being geographically indistinct. In another embodiment, the concept of a "conduit" or other common path may be provided within the physical layer view, thereby allowing a user to indicate when two fibers share the same geographic path. In yet another embodiment, each element is associated with a geographic indicator or label. Those elements having a common location or path may share a common geographic indicator or label.

Once associations are made between the physical elements at the physical layer and geographical location, then in step 306 of the method 300 the user may begin to configure the Ethernet network by developing links between Ethernet elements, such as the Ethernet switches. In particular, in step 306, the user may choose to connect two Ethernet elements (i.e. switches) by way of an MLT.

In step 308, a first lightpath is aggregated added to the MLT. In some embodiments, the user may be presented with a picklist of possible candidate lightpaths based upon the physical layer structure, availability and the user's selection of the two Ethernet switches to be connected. In other embodiments, the user may build a lightpath between the two Ethernet switches through selecting (for example, using a mouse or other input device) individual wavelengths on individual hops between the two Ethernet switches. In the latter case, the software may rationalize wavelength selections to minimize the number of wavelength changes at any cross-connect switches.

Based upon the aggregation of the first lightpath to the MLT, in step 310 the available lightpaths having a distinctive geographic path may be identified. A candidate lightpath may be identified on the basis that it has a geographic path distinct from the geographic path associated with the first lightpath aggregated to the MLT. In an embodiment wherein the associations between geography and optical fibers are made by way of groupings of commonly located elements, then the available candidate lightpaths may be identified on the basis that they (or their associated photonic elements) are not grouped with the first lightpath (or its associated photonic elements) as sharing a geographic path or loci. In an embodiment wherein each lightpath or phonotic element is given a geographic indicator or label associated with its path, then the identification of geographically distinctive lightpaths may be made on the basis of a comparison of labels or indicators to identify distinctive ones. In one embodiment, the candidate lightpaths having a distinctive geographic path from the first lightpath may be highlighted in the physical layer view of the graphical user interface or may be presented to the user in a picklist for ease of selection.

In step 312, the user may aggregate a further lightpath to the MLT. The further lightpath may be selected in the same manner as the first lightpath. In one embodiment, the further lightpath may only be one of the candidate lightpaths identified in step 310 and if no such lightpaths exist, then the user may be presented with a message indicating the resiliency problem with the network design. In another embodiment, the further lightpath may or may not be one of the candidate lightpaths identified in step 310. If the further lightpath is not geographically distinct, then in step 314 the user may be presented with a message or alert to signify that the MLT does not yet provide resiliency. This may prompt the user to delete the non-distinctive lightpath, alter the physical plant, and/or add additional lightpaths to the MLT as indicated in step 316, or ignore the message if the user does not require resiliency. At step 316, the user has the option of adding more lightpaths to the MLT, in which case the method 300 cycles back to step 310. It will be appreciated that in some instances no geographically distinct lightpaths may exist for an MLT having one or more lightpaths already aggregated. In this case, a caution message may be provided to warn the user that any further lightpaths will add capacity, but may not significantly improve resiliency.

If the user is satisfied with the MLT created in steps 306-314, then the method 300 continues to step 318 where the user may be permitted to add a further MLT to the Ethernet network. In this case, the method 300 returns to step 306 to repeat the process for the new MLT. Otherwise, it continues to step 320 where the user may have the option of altering the physical optical network. For example, having attempted to configure the Ethernet network and having discovered that there are an insufficient number of wavelengths available, or an insufficiently geographically distinctive layout, the user may elect to redefine the physical plant. For example, the user may determine it is necessary to add wavelength capacity to the network by adding a fiber.

If the user is satisfied with the Ethernet network, then the method 300 ends with step 322 whereupon the configuration information regarding the MLTs and their constituent lightpaths is output. It will be appreciate that the output may include saving the data to a file on a computer readable memory, sending the data to a remote computer as a message or file, printing the data, displaying the data, etc. The configuration information output may include port and wavelength connection information in sufficient detail to guide a technician to configure the optical equipment in accordance with the design. The configuration information output may include port and wavelength connection information in sufficient detail to provide a management system with enough information to trigger automatic reconfiguration of the optical nodes and other components of the photonic network.

Those skilled in the art will appreciate that the above-described method 300 may, in some embodiments, be modified such that certain steps are added or eliminated or certain described steps are performed in a different sequence or are performed concurrently with other steps. The scope and range of changes that may be made without impacting the overall operation of the method 300 will be understood by those skilled in the art.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A network planning tool for configuring at least one Ethernet Multi-Link Trunk over a wavelength-division-multiplexed (WDM) optical network, the network planning tool comprising:
    at least one processor; and
    at least one storage medium, the storage medium being configured to store instructions executable by the processor, the instructions comprising:
        instructions executable to access configuration information for the WDM optical network, the configuration information comprising:
            geographic location information for photonic layer elements of the WDM optical network; and
            available lightpaths between specified terminal devices connected to the WDM optical network; and
        instructions executable to display the available lightpaths between the specified terminal devices connected to the WDM optical network together with geographic location information associated with each of the available lightpaths; and
        instructions executable to enable selection of one of the available lightpaths for aggregation as a link of an Ethernet Multi-Link Trunk between the specified terminal devices connected to the WDM optical network.

2. A network planning tool as defined in claim 1, wherein the instructions executable to display the available lightpaths comprise instructions executable to display a picklist of the available lightpaths between the specified terminal devices.

3. A network planning tool as defined in claim 2, wherein the instructions executable to display the available lightpaths comprise instructions executable to display geographic location information associated with each of the available lightpaths on the picklist.

4. A network planning tool as defined in claim 2, wherein the instructions executable to display the available lightpaths comprise instructions executable to display the available lightpaths in groups, each group corresponding to a respective geographic path.

5. A network planning tool as defined in claim 1, wherein the instructions executable to display the available lightpaths comprise instructions executable to display a physical layer view of the WDM optical network, the physical layer view including geographic location information for photonic layer elements on the available lightpaths.

6. A network planning tool as defined in claim 5, wherein the instructions executable to display the available lightpaths comprise instructions for labeling lightpaths displayed in the physical layer view according to their availability.

7. A network planning tool as defined in claim 5, wherein the instructions executable to display the available lightpaths comprise instructions for highlighting lightpaths displayed in the physical layer view according to their availability.

8. A network planning tool as defined in claim 5, wherein the storage medium is operable to store instructions executable to display an optical Ethernet view of the WDM optical network.

9. A network planning tool as defined in claim 8, wherein the storage medium is operable to store instructions for highlighting a selected lightpath in the physical layer view when that lightpath is selected in the optical Ethernet view.

10. A network planning tool as defined in claim 1, wherein the storage medium is further to store:
    instructions executable to determine whether a particular lightpath selected for aggregation as a link of the Ethernet Multi-Link Trunk between the specified terminal devices connected to the WDM optical network is geographically diverse with respect to other lightpaths previously selected for aggregation as links of the Ethernet Multi-Link Trunk; and
    instructions executable to provide an indication when the particular lightpath selected for aggregation as a link of the Ethernet Multi-Link Trunk is not geographically diverse with respect to other lightpaths previously selected for aggregation as links of that the Ethernet Multi-Link Trunk.

11. A method of operating a network planning tool for configuring at least one Ethernet Multi-Link Trunk over a wavelength-division-multiplexed (WDM) optical network, the method comprising:
    displaying available lightpaths between specified terminal devices connected to the WDM optical network together with geographic location information associated with each of the available lightpaths based on stored configuration information for the WDM optical network, the configuration information comprising:
        geographic location information for photonic layer elements of the WDM optical network; and
        available lightpaths between the specified terminal devices connected to the WDM optical network; and
    enabling selection of one of the available lightpaths for aggregation as a link of an Ethernet Multi-Link Trunk between the specified terminal devices connected to the WDM optical network.

12. A method as defined in claim 11, wherein the displaying the available lightpaths comprises displaying a picklist of the available lightpaths between the specified terminal devices.

13. A method as defined in claim 12, wherein the displaying the available lightpaths comprises displaying geographic location information associated with each of the available lightpaths on the picklist.

14. A method as defined in claim 12, wherein the displaying the available lightpaths comprises displaying the available lightpaths in groups, each group corresponding to a respective geographic path.

15. A method as defined in claim 11, wherein the displaying the available lightpaths comprises displaying a physical layer view of the WDM optical network, the physical layer view including geographic location information for photonic layer elements on the available lightpaths.

16. A method as defined in claim 15, wherein the displaying the available lightpaths comprises labeling lightpaths displayed in the physical layer view according to their availability.

17. A method as defined in claim 15, wherein the displaying the available lightpaths comprises highlighting lightpaths displayed in the physical layer view according to their availability.

18. A method as defined in claim 15, further comprising displaying an optical Ethernet view of the WDM optical network.

19. A method as defined in claim 18, further comprising highlighting a selected lightpath in the physical layer view when that lightpath is selected in the optical Ethernet view.

20. A method as defined in claim 11, further comprising:
   determining whether a particular lightpath selected for aggregation as a link of the Ethernet Multi-Link Trunk between the specified terminal devices connected to the WDM optical network is geographically diverse with respect to other lightpaths previously selected for aggregation as links of the Ethernet Multi-Link Trunk; and
   providing an indication when the particular lightpath selected for aggregation as a link of the Ethernet Multi-Link Trunk is not geographically diverse with respect to other lightpaths previously selected for aggregation as links of the Ethernet Multi-Link Trunk.

21. A non-transitory processor-readable medium for use in a network planning tool, the medium carrying instructions executable by a processor, the instructions comprising:
   instructions executable to access configuration information for a wavelength-division-multiplexed (WDM) optical network, the configuration information comprising:
      geographic location information for photonic layer elements of the WDM optical network; and
      available lightpaths between specified terminal devices connected to the WDM optical network;
   instructions executable to display the available lightpaths between the specified terminal devices connected to the WDM optical network together with geographic location information associated with each of the available lightpaths; and
   instructions executable to enable selection of one of the available lightpaths for aggregation as a link of an Ethernet Multi-Link Trunk between the specified terminal devices connected to the WDM optical network.

22. A processor-readable medium as defined in claim 21, wherein the instructions executable to display the available lightpaths comprise instructions executable to display a picklist of the available lightpaths between the specified terminal devices.

23. A processor-readable medium as defined in claim 22, wherein the instructions executable to display the available lightpaths comprise instructions executable to display geographic location information associated with each of the available lightpaths on the picklist.

24. A processor-readable medium as defined in claim 22, wherein the instructions executable to display the available lightpaths comprise instructions executable to display the available lightpaths in groups, each group corresponding to a respective geographic path.

25. A processor-readable medium as defined in claim 21, wherein the instructions executable to display the available lightpaths comprise instructions executable to display a physical layer view of the WDM optical network, the physical layer view including geographic location information for photonic layer elements on the available lightpaths.

26. A processor-readable medium as defined in claim 25, wherein the instructions executable to display the available lightpaths comprise instructions for labeling lightpaths displayed in the physical layer view according to their availability.

27. A processor-readable medium as defined in claim 25, wherein the instructions executable to display the available lightpaths comprise instructions for highlighting lightpaths displayed in the physical layer view according to their availability.

28. A processor-readable medium as defined in claim 25, wherein the storage medium stores instructions executable to display an optical Ethernet view of the WDM optical network.

29. A processor-readable medium as defined in claim 28, wherein the storage medium stores instructions for highlighting a selected lightpath in the physical layer view when that lightpath is selected in the optical Ethernet view.

30. A processor-readable medium as defined in claim 21, wherein the storage medium stores:
   instructions executable to determine whether a particular lightpath selected for aggregation as a link of the Ethernet Multi-Link Trunk between the specified terminal devices connected to the WDM optical network is geographically diverse with respect to other lightpaths previously selected for aggregation as links of the Ethernet Multi-Link Trunk; and
   instructions executable to provide an indication when the particular lightpath selected for aggregation as a link of the Ethernet Multi-Link Trunk is not geographically diverse with respect to other lightpaths previously selected for aggregation as links of the Ethernet Multi-Link Trunk.

* * * * *